Figure 1:
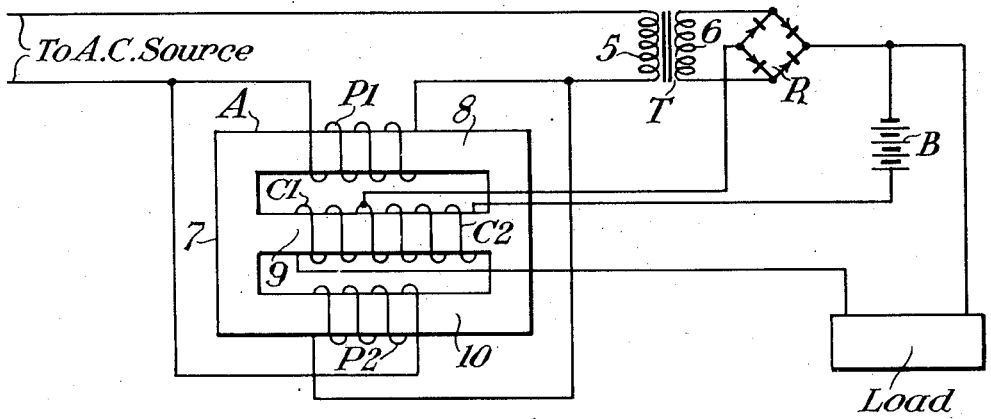

June 15, 1943.　　L. K. HEDDING　　2,322,130

ELECTRICAL REGULATING APPARATUS

Original Filed Oct. 6, 1939

INVENTOR
Linnie K. Hedding.
BY
HIS ATTORNEY.

Patented June 15, 1943

2,322,130

UNITED STATES PATENT OFFICE 2,322,130

ELECTRICAL REGULATING APPARATUS

Linnie K. Hedding, Wilkinsburg, Pa., assignor to The Union Switch & Signal Company, Swissvale, Pa., a corporation of Pennsylvania Original application October 6, 1939, Serial No. 298,299. Divided and this application January 16, 1942, Serial No. 427,043

9 Claims. (Cl. 175—363).

My invention relates to electrical regulating apparatus of the type employed to regulate the output of a rectifier which supplies energy to a direct current load from a source of alternating current. More particularly, my invention relates to electrical regulating apparatus for furnishing a constant unidirectional voltage from a rectifier regardless of variations in the voltage of the alternating current source and also regardless of variations in the amount of current drawn by the load.

Regulating apparatus of the above described type heretofore proposed utilizes the direct current drawn by the load to control the power output of the rectifier, and also provides a compensating control which aids or opposes the control established by the load current according as the voltage output of the rectifier is below or above the desired constant voltage. Usually, such control is established through the medium of a saturable reactor or a saturable transformer, in both of which cases the direct current output of the rectifier is caused to create a flux which controls the reluctance of a saturable core upon which are mounted alternating current windings, thereby effecting control of the power output of the rectifier. I have found that when the direct current output of a rectifier is employed in the above manner to effect regulation of the rectifier, alternating current is caused to flow in the output circuit of the rectifier by virtue of the presence of both alternating and unidirectional fluxes in the cores of such regulating devices due to mounting both alternating and direct current windings on such cores. Thus, for example, although alternating current of the fundamental frequency and its odd harmonics can be and has been eliminated or balanced out of the rectifier output by regulating apparatus of the type heretofore proposed, I have found that a double frequency alternating current ripple usually is superimposed upon and flows in the output circuit of the rectifier. Under certain conditions, any alternating current ripple in the rectifier output is very undesirable, and for that reason use of rectifiers as a source of unidirectional energy has been somewhat limited. I have also found that rectifier regulation under low load conditions is difficult to obtain by regulating apparatus now known to the art, and that usually a separate impedance energized in shunt with the rectifier must be employed to improve the regulation obtainable by the regulating apparatus now in use.

Accordingly, an object of my present invention is the provision in regulating apparatus of the type described, of novel and improved means whereby the load current delivered by a rectifier is utilized to control the power output of the rectifier.

Another object of my invention is the provision of novel and improved regulating apparatus of the type described whereby the direct current output of a rectifier is utilized to control the power output of the rectifier without causing any resultant alternating current components to be superimposed upon the rectifier output.

A further object of my invention is the provision, in regulating apparatus of the type described, of novel and improved means for obtaining regulation of the power output of a rectifier under low load conditions.

Other objects and advantages of my invention will appear from the following description taken in connection with the accompanying drawing.

The present application is a division of my co-pending application Serial No. 298,299 filed on October 6, 1939, for Electrical regulating apparatus.

I shall describe two forms of apparatus embodying my invention, and shall then point out the novel features thereof in claims.

Figure 2:
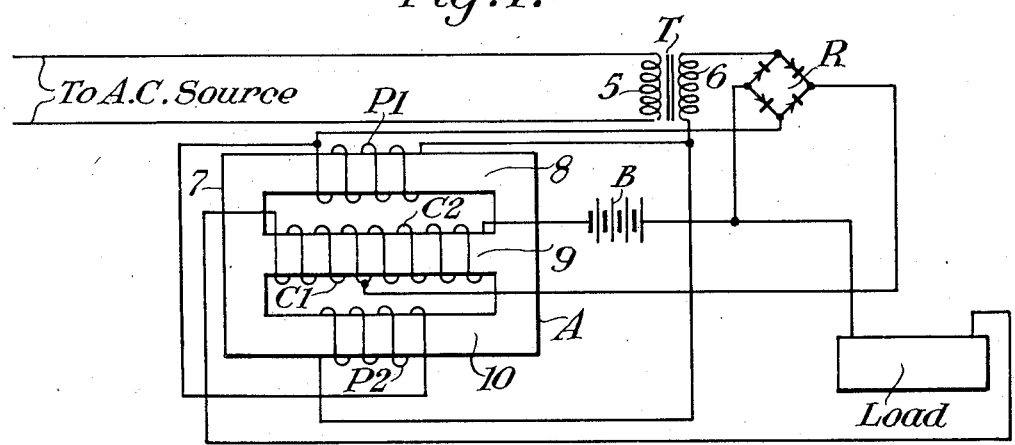

In the accompanying drawing, Fig. 1 is a diagrammatic view showing a preferred form of apparatus embodying my invention. Fig. 2 is a diagrammatic view showing a modified form of the apparatus shown in Fig. 1, also embodying my invention.

Similar reference characters refer to similar parts in each of the two views.

Referring first to Fig. 1, the reference character T designates a transformer, the primary 5 of which is supplied with alternating current from a source which is not shown on the drawing, and the secondary 6 of which transformer T is connected with the input terminals of a full wave rectifier R which in turn has its output terminals connected with a variable direct current load. A stand-by source of power, shown as a battery B, also is connected across the load.

The reference character A designates a regulating device comprising a magnetizable core 7 having three parallel legs 8, 9 and 10, which are connected together at each end to form an integral core structure. An alternating current winding, which comprises two coils P1 and P2 connected in parallel, is disposed on the two outer legs 8 and 10 of the core, one coil P1 being disposed on leg 8 and the other coil P2 being disposed on leg 10. The coils P1 and P2 are proportioned to have an equal number of turns and are so arranged on core 7 that when energized, the two coils cooperate in circulating a flux through a magnetic circuit comprising both outer legs and the adjoining end portions of the core.

Regulating device A further comprises two control winding C1 and C2, both disposed on middle leg 9 of the core. When direct current energy is applied to one or both of the control windings, the unidirectional flux set up by such current threads core 7 through two parallel magnetic circuits, one circuit of which comprises the middle leg 9, outer leg 8 and the adjoining end portions of the core, and the other magnetic circuit comprises middle leg 9, outer leg 10 and the adjoining end portions of the core. It is readily apparent, therefore, that the unidirectional flux set up by windings C1 and C2 is effective to vary the reluctances of legs 8 and 10 of the core and thereby control the impedance of coils P1 and P2, respectively.

As can be seen from an inspection of Fig. 1, the alternating current winding of device A is interposed between the alternating current source and one terminal of primary 5 of transformer T. It follows, therefore, that by varying the impedance of the alternating current winding of device A, the power input to primary 5 of transformer T is correspondingly varied. This variation of power input to transformer T will, of course, be reflected by a corresponding variation in the output of rectifier R.

The first or load current control winding C1 of device A is interposed between one output terminal of rectifier R and the load, and is, therefore, energized in accordance with the current drawn by the load. The second or battery current control winding C2 of device A is interposed in series with control winding C1 between the stand-by source of power, battery B, and the load. Battery B preferably is selected to have a predetermined terminal voltage substantially equal to the voltage at which it is desired to supply current to the load.

In normal operation, the current drawn by the load from rectifier R traverses winding C1 to set up a unidirectional flux in core 7 of device A, which flux establishes a given condition of reluctance for core 7 which determines the impedance of coils P1 and P2 and correspondingly determines the power input to rectifier R. Preferably, the parts of device A are so proportioned that substantially the entire current taken by the load is supplied from rectifier R so that little if any current is supplied by battery B to the load.

In the event load conditions vary so that an increased current is drawn by the load, thereby increasing the current through the control winding C1, the voltage across the output terminals of rectifier R will tend to drop. However, due to the increased current in winding C1, the impedance of the alternating current winding of device A is reduced, and consequently the voltage applied to primary 5 of transformer T is increased. This results in a higher induced voltage in secondary 6 of transformer T and correspondingly increases the output voltage of rectifier R. In addition, if the voltage delivered by the rectifier drops below the voltage of battery B, current will then flow from the battery to the load through both compensating windings C1 and C2, and this current will be in such direction as to assist the current supplied to the load from rectifier R through winding C1 in reducing the impedance of the alternating current winding of device A. As the result of the cooperation of control winding C2 with control winding C1, the input voltage of transformer T is regulated by device A until the output voltage of rectifier R equals the battery voltage. On the other hand, if the output voltage of rectifier R becomes greater than the voltage of battery B, current will then flow from rectifier R to battery B through winding C2 in such direction as to oppose or neutralize part of the saturating effect of the load current in winding C1, thereby tending to increase the impedance of the alternating current winding of device A and so reduce the voltage delivered to transformer T. In this latter case, the voltage applied to transformer T will be regulated by device A until the voltage output of rectifier R equals the battery voltage.

It follows that by properly proportioning the number of turns in the windings of the regulating device A, the apparatus may be made to function in such manner that the voltage delivered by rectifier R will at all times be equal to the voltage of battery B. In the event of failure of the alternating current source, battery B will function as a reserve source of current for the load at the same voltage as that which is supplied by the rectifier when the alternating current source is available.

The above described control of the output of rectifier R is effected by device A without causing any alternating current to flow in the output circuit of rectifier R, this being due to the fact that the two coils P1 and P2 of the alternating winding of device A are connected in parallel and have an equal number of turns so that as a result alternating flux will at no time be present in the middle leg of the core, and consequently no alternating current will be induced in control windings C1 and C2 by the alternating flux supplied to the core by coils P1 and P2.

It follows that with the coils P1 and P2 of device A connected in parallel, the device A is effective to cause the load to be supplied with unidirectional current substantially free from ripples. In the case of a non-inductive load supplied with current from a rectifier which has associated therewith the usual regulating reactor and a battery connected to the load through a winding on the reactor, the rectifier normally applies to the load a pulsating unidirectional electromotive force varying in magnitude from a maximum to a minimum of substantially zero twice in each cycle of the alternating voltage applied to the rectifier. A portion of this pulsating unidirectional electromotive force results from the rectifier output being comprised of alternate humps and valleys, and another portion results from an alternating current component induced in the direct current control windings of the reactor as a result of an unbalanced distribution of alternating current flux in the reactor. With the device A constructed as described heretofore, that is, with the coils P1 and P2 connected in multiple and battery B connected across the load through control windings C1 and C2, the multiple connection of the two coils P1 and P2 functions not only to avoid the induction of alternating current components in the load circuit by maintaining a balanced distribution of flux in the reactor, but also to reduce the impedance of the control windings C1 and C2 and during the intervals that the valleys occur in the unidirectional electromotive force supplied by the rectifier, battery B is enabled to supply current to the load through the control windings. The rectifier accordingly supplies the load with unidirectional current of pulsating character free from induced alternating current components, and the valleys in such current are substantially filled by current supplied from the battery. It follows, therefore, that the load is supplied with unidirectional current substantially free from ripples, i. e., having a substantially constant magnitude.

Improved regulation of rectifier R under low load conditions is effected by the apparatus of Fig. 1 due to the fact that the alternating current winding of device A is interposed between the alternating current source and the primary of the transformer, and as a result both the current drawn by the rectifier R and the current necessary to supply the transformer losses flows through the coils P1 and P2. It follows that by properly proportioning the parts of device A, the charging current, i. e., the current required to supply transformer losses, is made comparable in magnitude to the component of load current when a very light load is connected across the output terminals of rectifier R. This results in a greater alternating flux being supplied to the core of device A under low load conditions than if coils P1 and P2 were connected in series with the secondary winding 6 of transformer T, thereby improving the impedance characteristics of device A and providing a greater measure of regulation under low load conditions.

The apparatus shown in Fig. 2 is substantially similar to that shown in Fig. 1, except that in Fig. 2 the alternating current winding of device A is interposed between the secondary winding 6 of transformer T and one input terminal of rectifier R. It is believed that the operation of the apparatus of Fig. 2 will be readily apparent from the foregoing description of the apparatus of Fig. 1 together with an inspection of Fig. 2 without further detailed explanation. However, since the impedance characteristics of device A are modified in Fig. 2 due to the fact that the charging current of transformer T is not utilized, it might be necessary to connect a separate impedance (not shown) across the input terminals of rectifier R of Fig. 2 in order to enable the apparatus of Fig. 2 to provide regulation under low load conditions equivalent to the regulation provided by the apparatus of Fig. 1.

Although I have herein shown and described only two forms of regulating apparatus embodying my invention, it is understood that various changes and modifications may be made therein within the scope of the appended claims without departing from the spirit and scope of my invention.

Having thus described my invention, what I claim is:

1. The combination with a source of alternating current, a direct current load, a rectifier interposed between said source and said load, and a battery connected across said load, of a regulating device comprising a three-legged magnetizable core, an alternating current winding consisting of two coils connected in parallel and having an equal number of turns, said alternating current winding being interposed between said source and said rectifier and said two coils being disposed one on each outer leg of said core in such manner that both coils circulate flux in agreement through a magnetic circuit which includes both outer legs of the core in series, a first control winding disposed on the middle leg of said core and interposed between said rectifier and said load, and a second control winding disposed on the middle leg of said core and interposed between said load and said battery, whereby to maintain the output voltage of said rectifier substantially constant in response to unidirectional current in said first and second control windings and to cause said load to be supplied with unidirectional current substantially free from ripples.

2. The combination with a source of alternating current, a direct current load, a rectifier interposed between said sources and said load, and a battery connected across said load, of a regulating device comprising a three-legged magnetizable core, an alternating current winding comprising two coils connected in parallel and having an equal number of turns, said alternating current winding being interposed between said source and said rectifier and said two coils being disposed one on each outer leg of said core in such manner that both coils send flux in agreement around in a magnetic circuit which includes both outer legs of the core in series, a first control winding disposed on the middle leg of said core and interposed between said rectifier and said load, and a second control winding disposed on the middle leg of said core and interposed between said load and said battery, the relation between the polarity of said battery and the direction of said second control winding being such that the second winding opposes or aids the saturating effect of said first control winding according as the output voltage of said rectifier exceeds or is less than the voltage of said battery.

3. The combination with a transformer having its primary winding connected to a source of alternating current, a rectifier having its input terminals connected across the secondary winding of said transformer, and a battery connected in shunt with said rectifier across a direct current load, of a regulating device comprising a three-legged magnetizable core, an alternating current winding consisting of two coils connected in parallel and having like number of turns, said alternating current winding being interposed between said source and the primary winding of said transformer and having its two coils disposed one on each outer leg of said core in such manner that both coils circulate flux in agreement through a magnetic circuit which includes in series both outer legs of said core, and a first and a second control winding disposed on the middle leg of said core, said first control winding being interposed between said rectifier and said load, said second control winding being interposed between said battery and said load, and the relation between the polarity of said battery and the direction of said second control winding being such that the second control winding opposes or aids the saturating effect of said first control winding according as the output voltage of said rectifier exceeds or is less than the voltage of said battery, whereby to maintain the output voltage of said rectifier substantially constant and cause said load to be supplied with unidirectional current substantially free from ripples.

4. The combination with a source of alternating current, a direct current load, a rectifier interposed between said source and said load, and a battery connected across said load, of a three-legged magnetizable core, an alternating current winding comprising two coils connected in parallel and having like numbers of turns, said alternating current winding being interposed between said source and said rectifier and having its two coils disposed one on each outer leg of said core, a first control winding interposed between said rectifier and said load and a second control winding interposed between said battery and said load, each of said control windings being disposed on said core in such manner as to circulate flux through the outer legs of the core to thereby vary the reluctance of such legs, and the two coils of said alternating current winding being disposed on said two outer legs in such manner as to be responsive to the variations in reluctance of said legs caused by current flowing in said control windings and to avoid the induction of alternating current components in said control windings, whereby to maintain the output voltage of said rectifier substantially constant over a wide range of load conditions and cause said load to be supplied with unidirectional current substantially free from ripples.

5. The combination with a transformer having its primary winding connected to a source of alternating current, a rectifier having its input terminals connected across the secondary winding of said transformer, and a direct current load and a battery connected in multiple across the output terminals of said rectifier, of a regulating device comprising a three-legged magnetizable core provided with an alternating current winding interposed between said source and said primary winding and comprising two coils connected in parallel and having like number of turns, said two coils being disposed one on each outer leg of said core, said device also comprising two control windings one of which is interposed between said rectifier and said load and the other of which is interposed between said rectifier and said battery, said two control windings each being disposed on said core in such manner as to circulate flux through the outer legs of said core to thereby control the impedance of the two coils of said alternating current winding whereby to maintain the output voltage of said rectifier substantially constant over a wide range of load conditions and cause said load to be supplied with unidirectional current substantially free from ripples.

6. The combination with a transformer having its primary winding connected to a source of alternating current, a rectifier having its input terminals connected across the secondary winding of said transformer, and a direct current load and a battery connected in shunt across the output terminals of said rectifier, of a three-legged magnetizable core provided with an alternating current winding comprising two coils connected in multiple and having an equal number of turns, said two coils being interposed between said secondary winding and said rectifier and being disposed one on each outer leg of said core in such manner that both coils circulate flux in agreement through a magnetic circuit which includes in series both outer legs of the core, a first control winding disposed on the middle leg of said core and interposed between said rectifier and said load, and a second control winding disposed on the middle leg of said core and interposed between said rectifier and said battery, the relation of the second control winding to the first control winding being such that the flux created by the second control winding opposes or aids the flux created by the first control winding according as the output voltage of said rectifier exceeds or is less than the voltage of said battery, whereby the output voltage of said rectifier is maintained constant by the current flowing in said control windings and the induction of alternating currents in said control windings is avoided.

7. An automatic rectifier for maintaining the load voltage substantially constant irrespective of variations in the load current comprising, in combination with a source of alternating current, a load, a rectifier energized from said source and supplying current to said load, and a battery connected across said load; a regulating device comprising a magnetizable core having a plurality of legs which are connected together at the ends thereof, a pair of reactance coils each of which has an equal number of turns connected in parallel with each other and interposed between said source and said rectifier, one reactance coil being wound on a first leg of said core and the other reactance coil being wound on a second leg of the core in such direction that substantially equal and aiding fluxes are established in the magnetic path which includes said first and second legs, and a pair of saturation control windings wound on a third leg of said core, one saturation winding being interposed between said rectifier and said load and the other saturation winding being interposed between said battery and said load, the polarity of said battery and the direction of said other saturation winding being such that the latter winding opposes or aids the saturating effect of said one saturation winding respectively according as the output voltage of said rectifier exceeds or is less than the voltage of said battery, whereby the parallel connection and relative winding direction of said reactance coils provides a low impedance short-circuit path to aid in suppressing ripples in the rectifier output current flowing through said one saturation winding and whereby the battery is rendered more effective in smoothing out said ripples due to the low impedance of said other saturation winding resulting from said short-circuited path.

8. An automatic rectifier for maintaining the load voltage substantially constant irrespective of variations in the load current comprising, in combination with a source of alternating current, a load, a rectifier energized from said source and supplying current to said load, and a battery connected across said load; a transformer interposed between said source and said rectifier, the magnetizing current of said transformer being comparable in magnitude to the current taken by said load under light load conditions, a regulating device comprising a magnetizable core having a plurality of legs which are connected together at the ends thereof, a pair of reactance coils connected in parallel with each other and interposed between said source and the input winding of said transformer, one reactance coil being wound on a first leg of said core and the other reactance coil being wound on a second leg of the core in such direction that substantially equal and aiding fluxes are established in the magnetic path which includes said first and second legs, and a pair of saturation control windings wound on a third leg of said core, one saturation winding being interposed between said rectifier and said load and the other saturation winding being interposed between said battery and said load, the polarity of said battery and the direction of said other saturation winding being such that the latter winding opposes or aids the saturating effect of said one saturation winding respectively according as the output voltage of said rectifier exceeds or is less than the voltage of said battery, whereby the parallel connection and relative winding direction of said reactance coils provides a low impedance short-circuit path to aid in suppressing ripples in the rectifier output current flowing through said one saturation winding and whereby the battery is rendered more effective in smoothing out said ripples due to the low impedance of said other saturation winding resulting from said short-circuit path.

9. An automatic rectifier for maintaining the load voltage substantially constant irrespective of variations in the load current comprising, in combination with a source of alternating current, a load, a rectifier energized from said source and supplying current to said load, and a battery connected across said load; a regulating device comprising a three-legged magnetizable core having a pair of reactance coils each of which has an equal number of turns connected in parallel with each other and interposed between said source and said rectifier, one reactance coil being wound on a first leg of said core and the other reactance coil being wound on a second leg of the core, the fluxes established by said reactance coils in their respective legs being substantially equal, and a pair of saturation windings also wound on said core in such manner as to vary the saturation of said first and said second legs, one saturation winding being interposed between said rectifier and said load and the other saturation winding being interposed between said battery and said load, the polarity of said battery and the direction of said other saturation winding being such that the latter winding opposes or aids the saturating effect of said one saturation winding respectively according as the output voltage of said rectifier exceeds or is less than the voltage of said battery, whereby the parallel connection of said reactance coils provides a low impedance short-circuit path to aid in suppressing ripples in the rectifier output current flowing through said one saturation winding and whereby the battery is rendered more effective in smoothing out said ripples due to the low impedance of said other saturation winding resulting from said short-circuit path.

LINNIE K. HEDDING.